United States Patent Office.

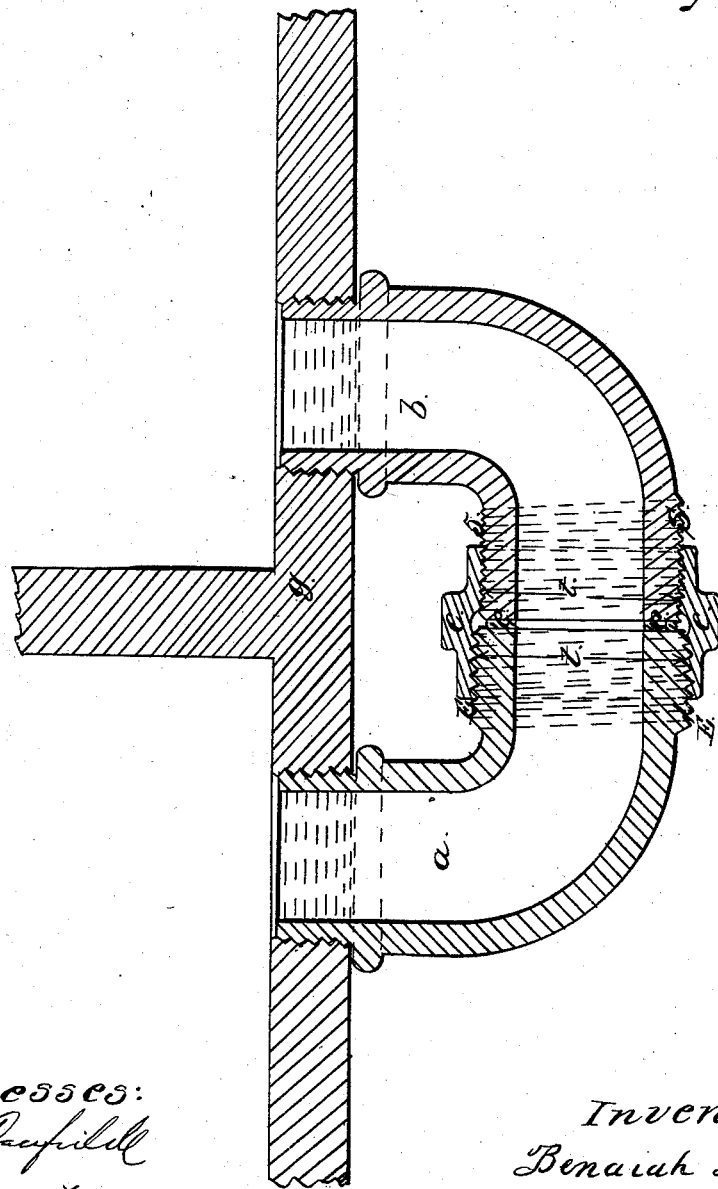

BENAIAH FITTS, OF NEWARK, NEW JERSEY.

Letters Patent No. 66,820, dated July 16, 1867.

IMPROVEMENT IN PIPE-COUPLINGS.

*The Schedule referred to in these Letters Patent and making part of the same.*

TO ALL WHOM IT MAY CONCERN:

Be it known that I, BENAIAH FITTS, of Newark, county of Essex, State of New Jersey, have invented a new and useful Improvement in Pipe-Couplings, for coupling together steam, gas, or water pipes; and I do hereby declare that the following is a full, clear, and exact description of the construction and operation of the same, reference being had to the annexed drawing, making a part of this specification.

The figure is a longitudinal section designed to represent two pieces of pipe screwed into a steam-chest and then coupled together.

The construction is as follows: $g$ is a plate of iron, and is supposed to represent one side of a steam-chest; $a$ and $b$ are two pieces of pipe; $c$ is the coupling or nut by which the pipes $a$ and $b$ are drawn and held together; $e$ is a packing of leather, rubber, or other suitable substance. At $r\ r$ on pipe $a$ is a screw formed, also at $s\ s$ on pipe $b$, but the thread or screw on $b$ is much finer or less pitch than the thread on $a$. The diameter of the pipe $a$ at the base of the thread (shown at $t$) should be as large as the diameter of pipe $b$ at the extreme outside of the thread (shown at $y$.) The coupling is then made as shown. A thread formed in one end to correspond with that on pipe $a$, and that in the other to correspond with thread on pipe $b$. The outside of the coupling formed convenient for the wrench.

To couple the pipes together, the coupling should be first turned on to pipe $b$ far enough to bring the end of the pipe and the end of the coupling nearly even. The packing $e$ is then put in and pipe $a$ brought up against it. The coupling is then turned off of pipe $b$ on to pipe $a$. The thread on pipe $a$ being coarser than pipe $b$ of course runs faster and draws the joints together enough to insure a tight joint in the packing. The utility of the coupling consists not only in its simplicity and efficiency, but it will be seen that it may be used where others cannot. What constitutes the peculiar feature of my invention is forming the thread on one pipe and one end of the coupling finer or less pitch than that of the other, as shown.

Thus having fully set forth my invention, what I claim is—

A pipe-coupling, constructed substantially as herein described.

BENAIAH FITTS.

Witnesses:
C. HALSEY CANFIELD,
J. N. DENNISSON.